(No Model.)
W. P. CRAIG.
FRUIT PICKER.
No. 403,331. Patented May 14, 1889.
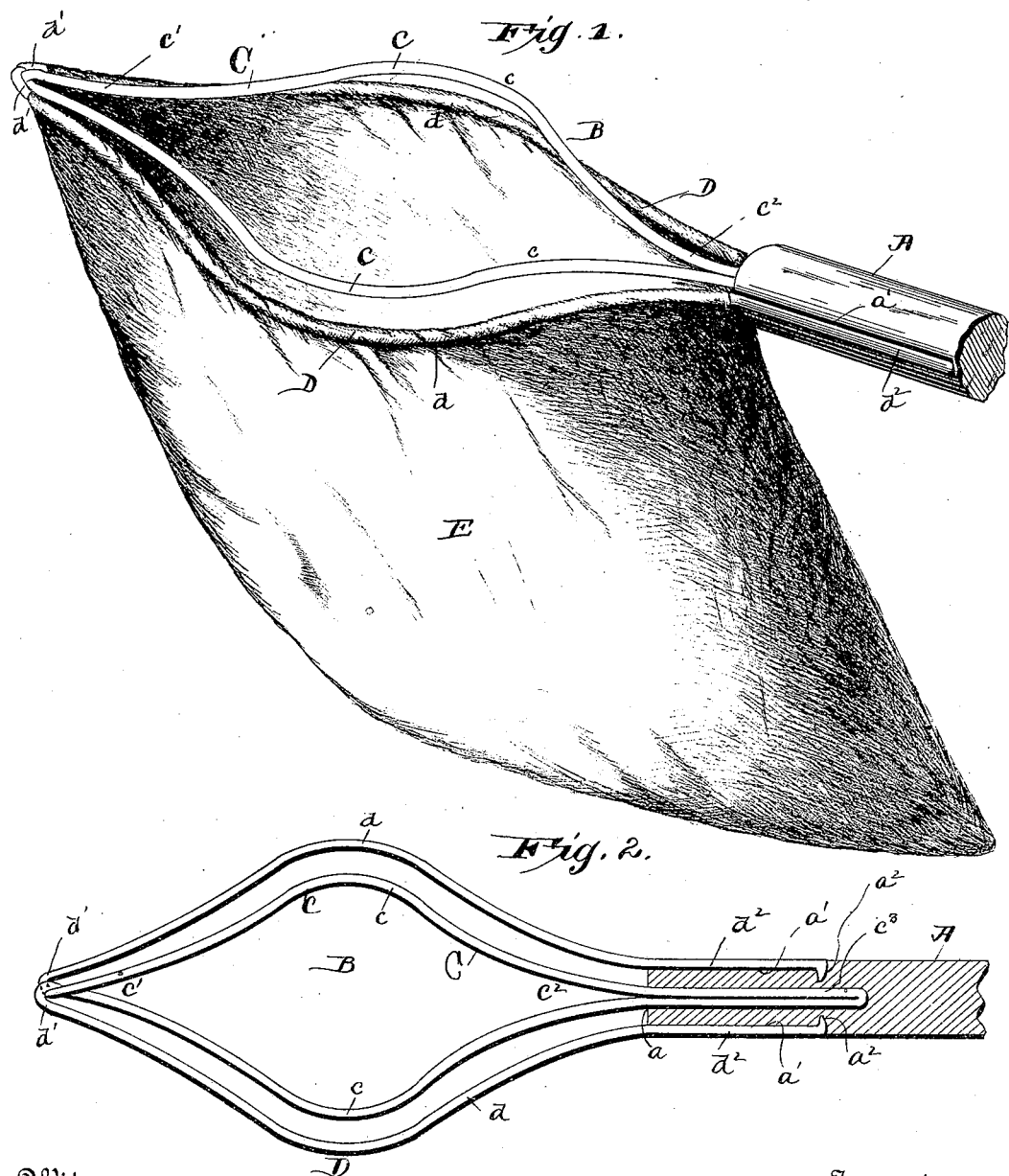
Witnesses.
Inventor,
William P. Craig
By his Attorneys

UNITED STATES PATENT OFFICE.

WILLIAM P. CRAIG, OF HOLDEN, MISSOURI.

FRUIT-PICKER.

SPECIFICATION forming part of Letters Patent No. 403,331, dated May 14, 1889.

Application filed December 26, 1888. Serial No. 294,595. (No model.)

*To all whom it may concern:*

Be it known that I, WILLIAM P. CRAIG, a citizen of the United States, residing at Holden, in the county of Johnson and State of Missouri, have invented new and useful Improvements in Fruit-Pickers, of which the following is a specifiction.

The invention relates to improvements in fruit-pickers; and it consists in a certain novel construction and combination of devices, fully described hereinafter in connection with the accompanying drawings, and specifically pointed out in the claims.

In the drawings, Figure 1 is a perspective view of a fruit-picker embodying my improvements. Fig. 2 is a plan view of the frame, showing the handle in section to illustrate the manner of securing the frame thereto.

Referring by letter to the drawings, A designates the handle of the picker, to one end of which is attached the frame B, which consists of the single wire, bent so as to form the diamond-shaped detacher C, and the sack-holder D, arranged slightly below the detacher. The sides $c\ c$ of the detacher are separated at their centers and converge toward their outer and inner ends to form the angles $c'$ and $c^2$, respectively. The inner ends of the sides are brought together to form a tang, $c^3$, which is inserted in a socket, $a$, in the end of the handle. The elliptical sack-holder is integral with the detacher and consists of the sides $d\ d$, which extend from the outer ends of the sides $c\ c$ of the detacher and are formed by making the bends $d'\ d'$ at the outer ends of the sides $c\ c$ and then extending the sides of the sack-holder backward, substantially parallel with the sides $c\ c$ of the detacher. The bends $d'\ d'$ are interlaced, so as to connect the free or outer ends of the sides.

The inner ends of the sides $d\ d$ are provided with extensions $d^2\ d^2$, which are fitted in grooves $a'\ a'$ in the sides of the handle and are bent inward at their ends to form detents, which engage in sockets $a^2\ a^2$ in opposite sides of the handle.

The sack or receiver E is connected at its upper edge to the sack-holder D, which is arranged slightly below the plane of the detacher to prevent the latter from wearing the upper edge of the sack.

It will be seen that the frame of the fruit-picker consists of a single piece of wire, the ends of which form the detents which engage in sockets in opposite sides of the handle.

In operation the picker is raised until the fruit which is to be removed passes between the sides of the diamond-shaped detacher, and then the picker is either drawn downward or pushed upward, thereby engaging the stem of the fruit between the converging sides of the detacher and breaking the same, thereby allowing the fruit to fall into the sack.

Having described the invention, I claim—

1. In a fruit-picker, the frame made of a single piece of wire bent into the shape shown to form the diamond-shaped detacher having the converging sides $c\ c$, which form angles $c'$ and $c^2$, the tang formed by the inner ends of the said sides, and the sack-holder having the sides $d\ d$, which are connected at their outer ends to the outer ends of the sides $c\ c$ by the interlaced loops or bends $d'\ d'$, combined with the handle attached to the tang of the frame, and the sack attached to the sack-holder, substantially as specified.

2. In a fruit-picker, the combination, with the handle provided with a socket, $a$, in its end and the grooves $a'\ a'$ in its sides, of the frame comprising the detacher C, having the angles $c'$ and $c^2$ at its outer and inner ends, respectively, and provided with the sides $c\ c$, which are connected at their inner ends to form a tang, $c^3$, fitting in the socket $a$ in the end of the handle, and the sack-holder having the sides $d\ d$, the outer ends of which are integral with the outer ends of the sides $c\ c$, and provided at their inner ends with extensions $d^2\ d^2$, fitting in the grooves $a'\ a'$, and having detents on their ends fitting in sockets $a^2\ a^2$ in the sides of the handle, and the sack attached at its upper edge to the holder, substantially as specified.

In testimony that I claim the foregoing as my own I have hereto affixed my signature in presence of two witnesses.

WILLIAM P. CRAIG.

Witnesses:
FRANK A. STEELE,
L. W. JACK.